US008880525B2

(12) United States Patent
Galle et al.

(10) Patent No.: US 8,880,525 B2
(45) Date of Patent: Nov. 4, 2014

(54) FULL AND SEMI-BATCH CLUSTERING (75) Inventors: Matthias Galle, St-Martin d'Heres (FR); Jean-Michel Renders, Quaix-en-Chartreuse (FR)

(73) Assignee: Xerox Corporation, Norwalk, CT (US)

( * ) Notice: Subject to any disclaimer, the term of this patent is extended or adjusted under 35 U.S.C. 154(b) by 11 days.

(21) Appl. No.: 13/437,079

(22) Filed: Apr. 2, 2012

(65) Prior Publication Data

US 2013/0262465 A1 Oct. 3, 2013

(51) Int. Cl.
*G06F 17/30* (2006.01)

(52) U.S. Cl.
USPC .......................... 707/737; 707/722; 707/748

(58) Field of Classification Search
CPC ..................................................... G06F 17/30
USPC ......................................................... 707/737
See application file for complete search history.

(56) References Cited

U.S. PATENT DOCUMENTS

| | | | |
|---|---|---|---|
| 7,058,567 B2 | 6/2006 | Ait Mokhtar et al. | |
| 7,171,350 B2 | 1/2007 | Lin et al. | |
| 8,650,196 B1 * | 2/2014 | Zhou et al. | 707/737 |
| 2003/0101187 A1 | 5/2003 | Gaussier et al. | |
| 2003/0130998 A1 * | 7/2003 | Fox et al. | 707/3 |
| 2006/0242140 A1 * | 10/2006 | Wnek | 707/5 |
| 2007/0143101 A1 | 6/2007 | Goutte | |
| 2007/0239745 A1 | 10/2007 | Guerraz et al. | |
| 2008/0249999 A1 | 10/2008 | Renders et al. | |
| 2009/0210406 A1 * | 8/2009 | Freire et al. | 707/5 |
| 2009/0327320 A1 * | 12/2009 | Yan et al. | 707/101 |
| 2010/0191743 A1 | 7/2010 | Perronnin et al. | |
| 2011/0137898 A1 | 6/2011 | Gordo et al. | |
| 2012/0011124 A1 * | 1/2012 | Bellegarda | 707/739 |
| 2012/0030163 A1 | 2/2012 | Zhong et al. | |
| 2012/0284275 A1 * | 11/2012 | Vadrevu et al. | 707/738 |

OTHER PUBLICATIONS

Ailon, N., et al. "Aggregating inconsistent information", Journal of the ACM, Oct. 2005, pp. 684-693.
Ait-Mokhtar, S., et al. "Robustness beyond shallowness: incremental deep parsing", National Language Engineering, 2002, 8:121-144.
Allan, J., et al. "Taking topic detection from evaluation to practice", Proc. of the 38th Annual Hawaii Intl. Conf. on System Sciences, IEEE, 2004, pp. 1-10.
Aslam, J., et al. "The star clustering algorithm for static and dynamic information organization", Journal of Graph Algorithms and Applications, 2004, vol. 8, No. 1, pp. 95-129.

(Continued)

*Primary Examiner* — Wei Zhen
*Assistant Examiner* — Mohammed Huda
(74) *Attorney, Agent, or Firm* — Fay Sharpe LLP (57) ABSTRACT

A method for clustering documents is provided. Each document is represented by a multidimensional data point. The data points are initially assigned to a respective cluster and serve as their initial representative points. Thereafter, in an iterative process, the data points are clustered among the clusters, by assigning the data points to the clusters based on a comparison measure of each data point with the cluster or its representative point, and a threshold of the comparison measure. Based on this clustering, a new representative point for each of the clusters can be computed. Optionally, overlapping clusters are merged. For the next iteration, the new representative points are used as the representative points. An assignment of the documents to the clusters is output, based on a clustering of the data points in the latest iteration. Multiple batches may be processed, retaining the initial clusters to which the original batch was assigned.

18 Claims, 6 Drawing Sheets

(56) References Cited

OTHER PUBLICATIONS

Banerjee, A. et al. "Clustering with Bregman Divergences", Journal of Machine Learning Research, 6 (2005), pp. 1705-1749.
Bansal, N., et al. "Correlation clustering", Machine Learning, 2004, 56:89-113.
Chakrabarti, D., et al. "Evolutionary clustering", ACM Intl. Conf. on Knowledge discovery and data mining, 2006, pp. 1-7.
Charikar, M., et al. "Incremental clustering and dynamic information retrieval", ACM Symposium on Theory of Computing, 1997, pp. 626-365.
Comaniciu, D., et al. Mean Shift: a robust approach toward feature space analysis, IEEE Transactions on Pattern Analysis and Machine Intelligence, May 2002, vol. 24, No. 5, pp. 603-619.
Dhillon, I., et al. "Concept decomposition for large sparse text data using clustering", Machine Learning, 2001, 42 (1): 143-175.
Ester, M., et al. Incremental clustering for mining in a data warehousing environment, Proceedings of the Intl. Conf. on Very Large Data Bases, 1998, pp. 323-333.
Ester, M., et al. "A density-based algorithm for discovering clusters in large spatial databases with noise", Proc. 2nd Intl. Conf. on Knowledge Discovery and Data Mining (KDD), 1996, pp. 226-231.
Frey, B., et al. "Clustering by passing messages between data points", Science, Feb. 2007, vol. 315, pp. 972-976.
Fukunaga, K., et al. "The estimation of the gradient of a density function, with applications in pattern recognition", IEEE Transactions on Information Theory, vol. IT-21, No. 1, Jan. 1975, pp. 32-40.
Gil-Garcia, R., et al. "Extended star clustering algorithm", CIARP 2003, LNCS 2905, pp. 480-487.
Guha, S., et al. "Clustering data streams", IEEE Transactions on Knowledge and Data engineering, May 2003, 15 (3):515-528.
Gupta, C., et al. "GenIc: A single pass generalized incremental algorithm for clustering", SIAM International Conf. on Data Mining, 2004, pp. 137-153.
Al Hasan, M., et al. "Clustering with lower bound on similarity", PAKDD, 2009, pp. 122-133.
Heyer, L.J., et al. "Exploring expression data: Identification and analysis of coexpressed genes", Genome Research, Nov. 1999, 9:1106-1115.
Kastner, I., et al. "Automatic single-document key fact extraction from newswire articles", EACL, Association for Computational Linguistics, Mar. 2009, pp. 415-423.
Lashkari, D., et al. "Convex clustering with exemplar-based models", Advances in Neural Information processing systems, 2007, pp. 1-8.
Sculley, D. "Web-scale K-means Clustering", WWW, 2010, pp. 1-2.
Sheikh, Y.A., et al. "Mode-seeking by Medoidshifts", ICCV, 2007, pp. 1-8.
Vadrevu, S., et al. "Scalable clustering of news search results", WSDM, 2011, pp. 675-683.
Vedaldi, A., et al. "Quick shift and kernel methods for mode seeking", ECCV, 2008, pp. 705-718.
Wijaya, D., et al. "Journey to the Centre of the Star: Various ways of finding star centers in star clustering", Database and Expert Systems Applications, 2007, 660-670.
Yang, Y., et al. "A study on retrospective and on-line event detection", SIGIR, 1998, pp. 28-36.
Zhang, T., et al. "BIRCH: an efficient data clustering method for very large databases", ACM SIGMOD Record, 2006, vol. 25, pp. 103-114.

\* cited by examiner

FULL AND SEMI-BATCH CLUSTERING

BACKGROUND

The exemplary embodiment relates to clustering of documents and finds particular application in connection with a threshold-based clustering algorithm, suited to clustering news articles.

Clustering algorithms are useful tools for analyzing data. Many algorithms exist for this task, although their application to a particular problem is very much data-dependent. For example, in the case of news article clustering, clustering may be based on the detection of events inside a given collection of news articles coming from multiple sources. However, since the events themselves are often unpredictable in advance and the articles often arrive in small batches, the identification of clusters is challenging.

In this setting, so-called k-based algorithms tend to perform poorly. These algorithms take as input the number of expected clusters and try to fit the given points into k clusters guided by a selected score function. Typically, a user specifies several possible values for k (or an interval of values) and the score function is extended in order to be able to choose the best value for k, by including a complexity-penalizing term. However, it is generally not evident what could be the expected number of events at a given moment, and this number may change over time. Also, there are possibly outlier articles to deal with. These are documents which do not talk about any particular event. However, k-based algorithms are very sensitive to the presence of outliers.

Threshold-based clustering algorithms tend to be better suited to clustering in such a setting, where the given input is a threshold on the similarity (denoted by $\tau$) that relates to how close documents in the same cluster should be to each other. Popular algorithms in this setting includes DBSCAN (Martin Ester, et al., "A density-based algorithm for discovering clusters in large spatial databases with noise," in KDD, pages 226-231, 1996), Star Clustering (Javed A. Aslam, et al., "The Star Clustering Algorithm for Static and Dynamic Information Organization," Journal of Graph Algorithms and Applications, 8(1):95-129, 2004, hereinafter "Aslam"), Quality-Threshold (L. J. Heyer, "Exploring Expression Data: Identification and Analysis of Coexpressed Genes," Genome Research, 9(11):1106-1115, November 1999), and Correlation Clustering (Nikhil Bansal, et al., "Correlation Clustering," Machine Learning, November 2004). However, these algorithms do not deal well with sequential data.

The standard approach for such a setting is given by the single-pass (or fully-incremental) algorithm, one of the earliest and simplest threshold-based algorithms (J. Allan, et al., "Taking Topic Detection From Evaluation to Practice," in Proc. 38th Annual Hawaii International Conference on System Sciences, IEEE (2004); C. J. van Rijsbergen, "Information Retrieval" (Butterworths 1979)). In this approach, the data points are processed one by one. For any point p, its similarities to all existing clusters are computed and the data point is assigned to the closest one. In the case that no cluster is closer than $\tau$, a new singleton cluster is created for p. This algorithm considers all points only once and thus it may be very sensitive to the order of the data. A purely incremental approach is thus often not entirely suited to a variety of real applications, for example, when the items arrive in batches in which there is no specified order.

INCORPORATION BY REFERENCE

The following references, the disclosures of which are incorporated herein by reference in their entireties, are mentioned:

The following relate generally to clustering of items: U.S. Pub. No. 20120030163, published Feb. 2, 2012, entitled SOLUTION RECOMMENDATION BASED ON INCOMPLETE DATA SETS, by Ming Zhong, et al.; U.S. Pub. No. 20110137898, published Jun. 9, 2011, entitled UNSTRUCTURED DOCUMENT CLASSIFICATION, by Albert Gordo, et al.; U.S. Pub. No. 20100191743, published Jul. 29, 2010, entitled CONTEXTUAL SIMILARITY MEASURES FOR OBJECTS AND RETRIEVAL, CLASSIFICATION, AND CLUSTERING USING SAME, by Florent C. Perronnin, et al.; U.S. Pub. No. 20080249999, published Oct. 9, 2008, entitled INTERACTIVE CLEANING FOR AUTOMATIC DOCUMENT CLUSTERING AND CATEGORIZATION; U.S. Pub. No. 20070239745, published Oct. 11, 2007, entitled HIERARCHICAL CLUSTERING WITH REAL-TIME UPDATING, by Agnes Guerraz, et al.; U.S. Pub. No. 20070143101, published Jun. 21, 2007, entitled CLASS DESCRIPTION GENERATION FOR CLUSTERING AND CATEGORIZATION, by Cyril Goutte; and U.S. Pub. No. 20030101187, published May 29, 2003, entitled METHODS, SYSTEMS, AND ARTICLES OF MANUFACTURE FOR SOFT HIERARCHICAL CLUSTERING OF CO-OCCURRING OBJECTS, by Eric Gaussier, et al.

BRIEF DESCRIPTION

In accordance with one aspect of the exemplary embodiment, a method for clustering documents includes assigning each of a set of data points to a respective cluster, each of the data points representing a respective document. A plurality of iterations is performed. Each iteration includes clustering the data points among the clusters. This includes assigning the data points to the clusters based on a comparison measure of each data point with a representative point of each cluster, and a threshold of the comparison measure. Based on the clustering, a new representative point for each of the clusters is computed, which is used for the next iteration. An assignment of the documents to the clusters is output, based on a clustering of the data points in one of the iterations. One or more of the steps of the method may be performed with a computer processor.

In accordance with another aspect of the exemplary embodiment, a system for clustering documents includes memory which stores instructions for: assigning each of a set of data points to a respective cluster, each of the data points representing a respective document; and for a plurality of iterations: computing a comparison measure between each data point and each of a plurality of the clusters and assigning each data point to at least one of the clusters based on the comparison measure and a threshold of the comparison measure. Instructions are provided for outputting an assignment of the documents to the clusters, based on a clustering of the data points in one of the iterations. A processor in communication with the memory implements the instructions.

In accordance with another aspect of the exemplary embodiment, a method for clustering batches of documents includes receiving a first batch of documents and receiving a second batch of documents at a later time than the first batch. For the first batch of documents, the method includes performing an initial clustering, which includes assigning each of a set of data points to a respective cluster, each of the data points representing a respective one of the documents in the first batch of documents. For a plurality of iterations, the method includes clustering the data points among the clusters, including assigning the data points to the clusters based on a comparison measure of each data point with a representative point of each cluster, and a threshold of the comparison measure, based on the clustering, computing a new representative point for each of the clusters, and, optionally, merging overlapping clusters. An assignment of the documents in the first batch to the clusters is then output, based on a clustering of the data points in one of the iterations. For the second batch of documents, the method includes repeating the initial clustering, and plurality of iterations, retaining as clusters, the clusters to which the first batch of documents were assigned in the outputting. One or more of the steps of the method may be performed with a computer processor.

DETAILED DESCRIPTION

An exemplary clustering system and clustering method are disclosed which employ a score function that captures and formalizes the notion of what a good clustering should produce, as well as an algorithm that optimizes (e.g., maximizes) this score. While in the exemplary embodiment, specific reference is made to clustering of news articles, it is to be appreciated that the method and system are applicable to a variety of document types. For example, the method may find application in the clustering of journal articles, incoming emails, or the like.

The Exemplary system and method are applicable to both full batch and mini-batch settings. In a mini-batch setting, the news items periodically arrive in groups. The de facto standard algorithm used in this setting turns out to be very sensitive to the presumed order of the items in the groups. We show empirically that our algorithm provides clustering results as good as this standard algorithm, but without the drawback on relying on an optimal unknown order of items.

The exemplary system and method rely on an algorithm which may be considered to fall within the threshold-based family, but with an improved score function. In addition to the score function, optimization is performed in an Expectation-Maximization (EM) manner. The EM-like algorithm finds a local maximum of the score function. The exemplary method has been found to outperform existing algorithms for the news article clustering task.

The method can take as input (on-line) streaming data. For this application, the algorithm may be extended to address the dynamic, sequential case, where items arrive in sequence (one-by-one or in small groups that are referred to herein as mini-batches). As an example, a news-media aggregator may wish to bundle news articles for its clients. The aggregator may crawl certain news sources periodically (every hour or day for example), recover the new articles, and dispatch them for clustering. Often, there is no clear order inside this set and depending in which order items are presented the resulting clustering may vary. Additionally, it is advantageous to take into account the whole set of new articles before making any clustering decision (taking a global view versus a local view). To address these issues, a global algorithm can be adapted to this mini-batch mode. Experiments demonstrate that it provides a better solution also in this setting.

For solving large scale problems (in terms of number of news items), the mini-batch approach can prove a feasible alternative to global clustering, as it solves smaller sub-problems (the complexity is now proportional to the number of data points in the mini-batch) and is less sensitive to the order of the sequence of points in the mini-batch, unlike the traditional purely incremental approach.

For generality, the terms "comparison measure" or "comparison" or other similar phraseology is used herein to encompass both similarity measures and distance or divergence measures.

In the following, the terms "optimization," "minimization," and similar phraseology are to be broadly construed as one of ordinary skill in the art would understand these terms. For example, these terms are not to be construed as being limited to the absolute global optimum value, absolute global minimum, and so forth. For example, minimization of a function may employ an iterative minimization algorithm that terminates at a stopping criterion before an absolute minimum is reached. It is also contemplated for the optimum or minimum value to be a local optimum or local minimum value.

The exemplary threshold-based clustering algorithm may employ some or all of the following:

1. A score function that automatically identifies what a good clustering should be, unlike other methods in the threshold-based family, which exploit heuristics.

2. It relaxes the "leader" constraint. In conventional algorithms, a cluster is represented by a leader point (also known as a medoid) that is a real data point. This point is used as reference to compute similarities or distances. This freedom is particularly advantageous for news article clustering where several sources are involved and there is no clear central article.

3. In order to deal with on-line streams of news items, an extension of the algorithm is applicable to the mini-batch setting, where data points arrive by groups and have to be integrated into existing clusters.

The system and method also address some of the issues with existing clustering systems, such as:

1. The scalability issue: The system is able to cluster millions of documents efficiently.

2. The difficulty of choosing the right number of clusters: the system outputs the number of clusters.

3. The dynamic (streaming) environment framework: The system is able to cope with streams of documents and to adapt the clustering results dynamically or even completely on-line.

These are particularly advantageous in cases where the underlying topic structure is completely or largely unknown, or where there may be millions of documents which do not necessarily arrive at the same time. The system and method enable different levels of granularity to be investigated in a simple way.

Figure 1:
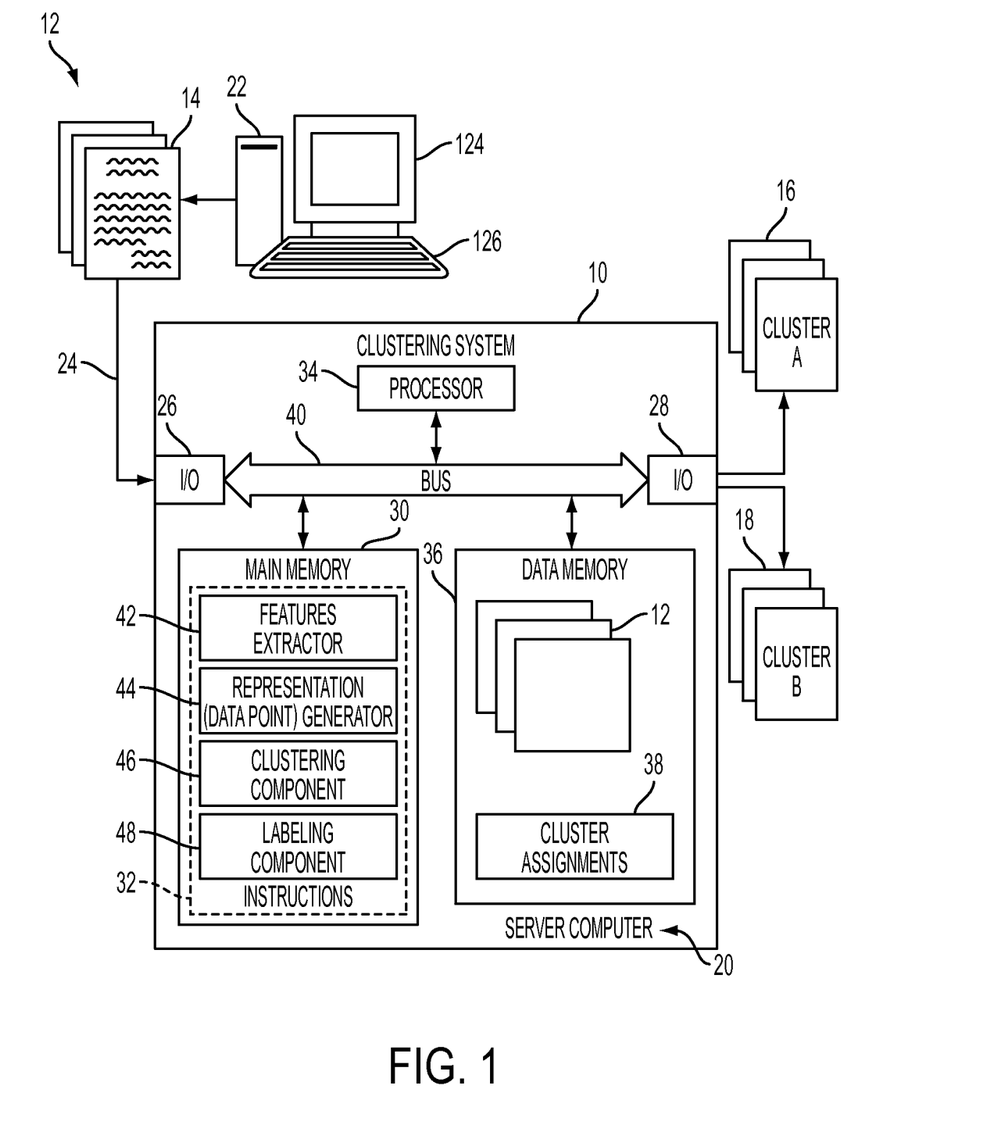
FIG. 1 is a functional bock diagram of a system for clustering documents in accordance with one aspect of the exemplary embodiment.

With reference to FIG. 1 an exemplary clustering system 10 is illustrated. The system 10 receives as input a set 12 of electronic documents 14 to be clustered. The exemplary documents 14 are text documents, such as news articles, although it is to be appreciated that the documents to be clustered may include images or a combination of images and text. The system processed the documents, either as a single batch or as a sequence of batches (mini-batches) that received at different times. The system outputs a clustering assignment. The clustering assignment assigns each document to a respective one of a set of two or more clusters 16, 18. Each document may be labeled in some manner with an identifier representative of the cluster to which it is assigned. The documents may be bundled into their respective clusters and sent for further processing.

The system 10 may be embodied in any suitable computing device, such as a server computer, desktop, laptop, or tablet computer, smartphone, or combination thereof. In the exemplary embodiment, the system is hosted by a server computer 20 and may receive the input documents from one or more client devices 22, e.g., via a wired or wireless link 24, such as the internet. The system 10 includes one or more input/output devices 26, 28, such as a modem, for communicating with such external devices.

The system includes main memory 30 which stores instructions 32 for performing the exemplary methods described below with reference to FIGS. 2 and 3, and a processor 34, in communication with the memory 30, for executing the instructions. Data memory 36 of the computer system stores the documents during processing and their cluster assignments 38 as they are progressively refined by the system. Hardware components of the system communicate via a data/control bus 40.

The illustrated instructions include a features extractor 42, which extracts a set of features from each document and a representation generator 44 which generates a statistical representation of the document in the form of a multidimensional data point, based on the extracted features. In general any suitable fixed length vectorial representation of the documents is contemplated. For example, in the case of text documents, at least a portion of the words in the document is considered as the features and a histogram of word frequencies is computed. For news articles, where the relevant content is often present in the first one or two paragraphs, the representation may be based on the first n words of the document, where n is a fixed number, such as n=100). The histogram may consider the frequencies of each of a fixed vocabulary (and/or short sequences of words), such as a limited dictionary of words/phrases which may exclude certain words commonly found in all documents (stop words). In the exemplary embodiment, the text is parsed by a parser which includes a named entity recognition component. Named entities within the text are flagged and feature in the histogram. Named entities of interest include person and organization names, location names. By way of example, the Xerox Incremental Parser (XIP) may be used for this task. See, Salah Ait-Mokhtar, Jean-Pierre Chanod, and Claude Roux, "Robustness beyond shallowness: incremental dependency parsing," in special issue of the NLE Journal (2002); U.S. Pat. No. 7,058,567, entitled NATURAL LANGUAGE PARSER, by Ait-Mokhtar, et al. U.S. Pat. No. 7,171,350, entitled METHOD FOR NAMED-ENTITY RECOGNITION AND VERIFICATION, by Lin, et al.; U.S. Pat. No. 6,975,766, entitled SYSTEM, METHOD AND PROGRAM FOR DISCRIMINATING NAMED ENTITY, by Fukushima; the disclosures of which are incorporated herein by reference in their entireties. A transformation, such as a term frequency-inverse document frequency (TF-IDF) transformation, may be applied to the word frequencies to reduce the impact of words which appear in all/many documents. The word/phrase frequencies are normalized to allow meaningful comparisons between documents. While L2 normalization is considered in the exemplary embodiment, is to be appreciated that any suitable normalization which allows a meaningful comparison metric between two representations to be computed may be considered. The result is in a vector of normalized frequencies (a data point), where each element of the vector corresponds to a respective dimension in the multidimensional space.

In the case of images, methods for generating representations based on low level visual features are well known. In these methods, features, such as color or texture features, are extracted from small patches of the image, e.g., on a grid, and from these features, an overall image representation is generated. See, for example, U.S. Pub. Nos. 20030021481; 2007005356; 20070258648; 20080069456; 20080240572; 20080317358; 20090144033; 20100040285; 20100092084; 20100098343; 20100226564; 20100191743; 20100189354; 20100318477; 20110040711; 20110026831; 20110052063; 20110091105; and references cited therein, the disclosures of which are incorporated herein by reference in their entities.

A clustering component 46 implements the exemplary clustering algorithm, described in further detail below.

A labeling component 48 receives the cluster assignments output by the clustering component and labels each of the documents 14 with a respective cluster label.

The memory 30, 36 may represent any type of non-transitory computer readable medium such as random access memory (RAM), read only memory (ROM), magnetic disk or tape, optical disk, flash memory, or holographic memory. In one embodiment, the memory 30, 36 comprises a combination of random access memory and read only memory. In some embodiments, the processor 34 and memory 30 and/or 36 may be combined in a single chip. The network interface 26, 28 allows the computer to communicate with other devices via a computer network, such as a local area network (LAN) or wide area network (WAN), or the internet, and may comprise a modulator/demodulator (MODEM).

The digital processor 34 can be variously embodied, such as by a single-core processor, a dual-core processor (or more generally by a multiple-core processor), a digital processor and cooperating math coprocessor, a digital controller, or the like. The digital processor 34, in addition to controlling the operation of the computer 20, executes instructions stored in memory 30 for performing the method outlined in FIGS. 2 and 3.

The term "software," as used herein, is intended to encompass any collection or set of instructions executable by a computer or other digital system so as to configure the computer or other digital system to perform the task that is the intent of the software. The term "software" as used herein is intended to encompass such instructions stored in storage medium such as RAM, a hard disk, optical disk, or so forth, and is also intended to encompass so-called "firmware" that is software stored on a ROM or so forth. Such software may be organized in various ways, and may include software components organized as libraries, Internet-based programs stored on a remote server or so forth, source code, interpretive code, object code, directly executable code, and so forth. It is contemplated that the software may invoke system-level code or calls to other software residing on a server or other location to perform certain functions.

As will be appreciated, FIG. 1 is a high level functional block diagram of only a portion of the components which are incorporated into a computer system 10. Since the configuration and operation of programmable computers are well known, they will not be described further.

Figure 2:
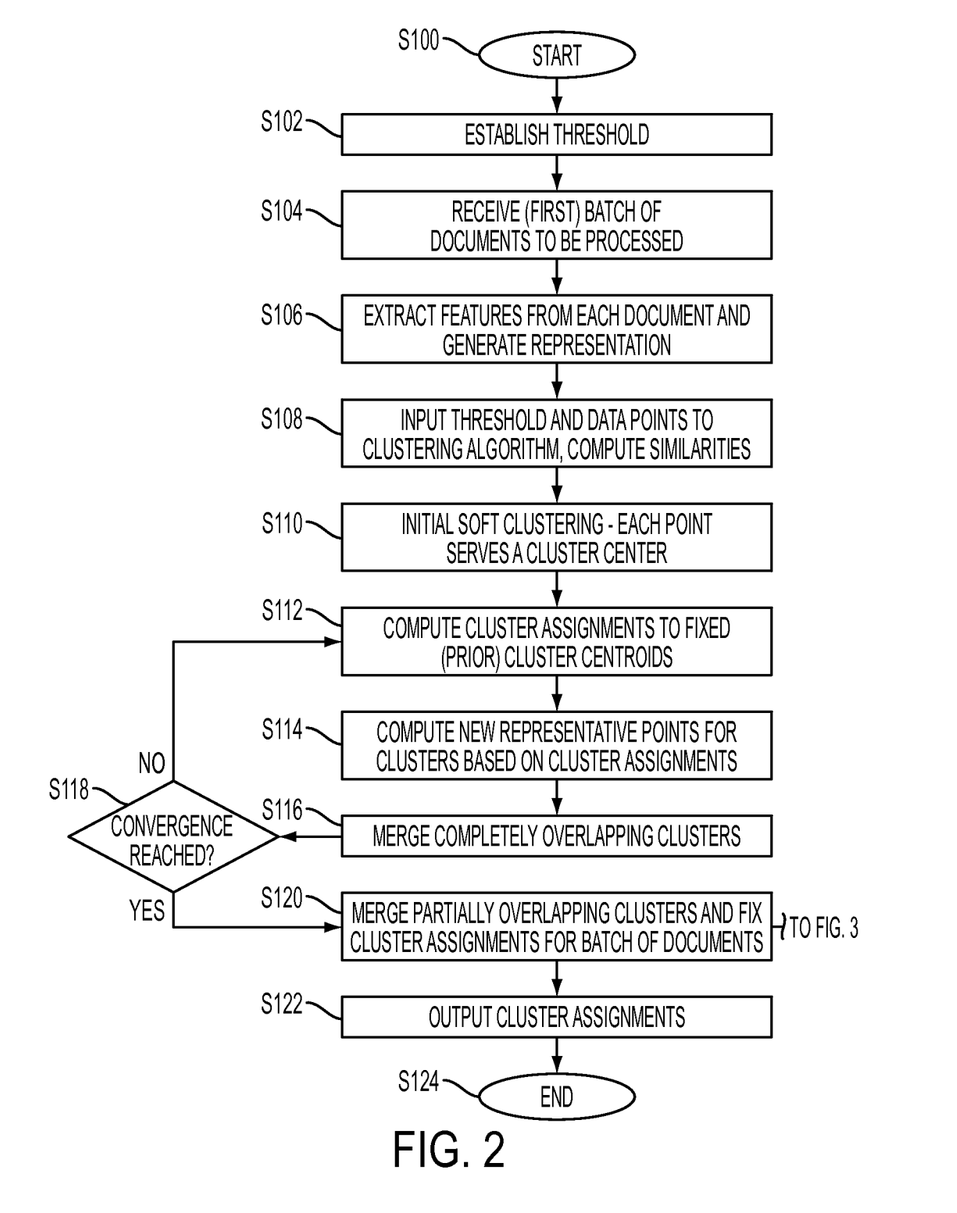
FIG. 2 is a flow chart illustrating a method for clustering documents in accordance with another aspect of the exemplary embodiment

FIG. 2 illustrates an exemplary clustering method for clustering a single batch 12 of documents. FIG. 3 illustrates a multi-batch clustering method, which may incorporate the method shown in FIG. 2 for clustering of a first of the batches. These methods are best understood with reference to the definitions and algorithm provided below.

The method begins at S100.

At S102, a comparison measure threshold $\tau$ is established. As explained below, this threshold determines whether a data point contributes positively or negatively to a score for a clustering, based on a computed comparison measure (e.g., distance), with respect to a representative point of a cluster to which the data point is assigned in the clustering. The comparison measure threshold $\tau$ may be user-defined and/or defined automatically, based on a training set of similar documents.

At S104, a batch 12 of documents 14 to be clustered is received into memory 36.

At S106, features are extracted from the document (by the features extractor 42), e.g., a set of words, and a multidimensional statistical representation (data point) is generated, based thereon (by the representation generator 44).

At S108, the clustering algorithm 46 takes as input the set of data points output at S106, representing the batch of documents to be clustered, and the predetermined comparison measure threshold $\tau$.

An initial "clustering" of the data points is performed at S110. The algorithm starts by considering each point as a potential cluster. The number of clusters thus corresponds to the number of points, and each point is assigned to its own cluster. In other embodiments, fewer than all data points are assigned to a unique cluster, such that some clusters initially have more than one data point.

An iterative optimization of the clustering of the data points is then initiated which includes alternating steps S112 and S114 (and optionally S116) for a number of iterations until a stopping point is reached. In general, each of steps S112 and S114 is performed at least twice. For example, optimization may continue while the clustering score does not converge from one iteration to the next (i.e., while the clustering score continues to improve by at least a threshold amount). In other embodiments, the number of iterations can be fixed, such as at least 3, or at least 5, or at least 10 iterations. The clustering in the last (or a later one) of these iterations is the input to S120.

In step S112, (an "Expectation" step), the cluster centers (representative points) are fixed and a cluster assignment is computed for all the data points, based on a comparison measure (e.g., the similarity) of the data point to the representative point and the comparison measure threshold $\tau$, e.g., according to Lemma 1 below. In this step, the assignments are soft, i.e., each point can be assigned to more than one cluster if it is less than the threshold distance $\tau$ from that cluster's representative point.

In step S114, a new representative point for each cluster is computed, based on the cluster assignment computed at S112 ("Maximization" step). The representative point can be the centroid (geometric center) of the data points assigned to a cluster (Lemma 2). A score for the set of clusters may then computed, e.g., according to Eqn. 1 below.

At S116, clusters which completely overlap each other may be merged to form a single cluster. Then, if at S118, a stopping point has not been reached, the method returns to S112 for one or more iterations of S112, S114, and optionally S116. In other embodiments, the cluster merging (S116) may be performed later, once the iterations are complete. At each new iteration of S112, the representative points used are those computed in the prior iteration at S114, so the assignments of the data points to the clusters is computed based on the distances (i.e., similarity) to the new representative points. Thus for example, if the representative point shifts away from a data point previously assigned to that cluster, the data point will no longer be assigned to this cluster if it is further than the predetermined threshold $\tau$ and there is another cluster to which it is closer than the threshold $\tau$.

At S120, any completely overlapping clusters may be merged, if they have not been already merged at S116. Additionally, partially overlapping clusters may also be merged if they obey one or more rules which specify that they can be merged, as discussed below.

At S122, the cluster assignments are output. In some embodiments, the output assignments may be soft, i.e., it is permitted for a document to be assigned to more than one of the final set of clusters. As will be appreciated, some, if not all of the documents are assigned to fewer than all of the final set of clusters. If a hard clustering is desired, data points may be assigned to their nearest cluster, if they have more than one assignment. In the hard clustering, each document is assigned to no more than one cluster, such as to exactly one cluster.

The method may end at S124, e.g., in the case of single batch processing.

For multi-batch clustering, the existing clusters defined at S120 are stored and used as inputs to the clustering algorithm 46, when the next batch of documents is received at a subsequent time. The method may then proceeds as shown in FIG. 3, discussed in further detail below.

The method illustrated in FIGS. 2 and/or 3 may be implemented in a computer program product that may be executed on a computer. The computer program product may comprise a non-transitory computer-readable recording medium on which a control program is recorded (stored), such as a disk, hard drive, or the like. Common forms of non-transitory computer-readable media include, for example, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge, or any other tangible medium from which a computer can read and use.

Alternatively, the method(s) may be implemented in transitory media, such as a transmittable carrier wave in which the control program is embodied as a data signal using transmission media, such as acoustic or light waves, such as those generated during radio wave and infrared data communications, and the like.

The exemplary method may be implemented on one or more general purpose computers, special purpose computer(s), a programmed microprocessor or microcontroller and peripheral integrated circuit elements, an ASIC or other integrated circuit, a digital signal processor, a hardwired electronic or logic circuit such as a discrete element circuit, a programmable logic device such as a PLD, PLA, FPGA, Graphical card CPU (GPU), or PAL, or the like. In general, any device, capable of implementing a finite state machine that is in turn capable of implementing the flowchart shown in FIGS. 2 and/or 3, can be used to implement the clustering method.

A definition of clustering will now be provided.

Definition of Clustering

Given a set P of data points, and a suitable comparison metric (so that distances or similarity measures can be defined between points), let the tuple $\langle C, \gamma \rangle$ represent a clustering over P, where C is the set of clusters and $\gamma: C \mapsto 2^P$ is a function that assigns to each cluster a set of points.

In general, the clustering can be required to be complete, that is that $P=\bigcup_{c \in C} \gamma(c)$, i.e., each point is assigned to at least one cluster. If $\gamma(c_1) \cap \gamma(c_2) \neq \emptyset$ for some clusters $c_1, c_2$, then the clustering $\langle C, \gamma \rangle$ is said to be a soft-clustering, i.e., it is permitted for one or more of the points to be each assigned to more than one cluster. In the case where there is no overlap between clusters and where the clustering is complete, the tuple $\langle C, \gamma \rangle$ is a partition of P, i.e., every point is assigned to exactly one cluster (hard clustering).

Star-EM Clustering Algorithm

The exemplary algorithm used herein may be referred to as the "Star-EM" algorithm as it has some similarity with the star clustering algorithms in existence. However, as will be evident from the following description, it incorporates an iterative optimization approach which has some similarities with the Expectation-Minimization (or Maximization) approach to optimizing a score function.

Conventional star clustering (see for example, Aslam), takes as input a similarity matrix and a threshold $\tau$. The algorithm proceeds greedily: a first point is chosen and all points closer than $\tau$ are assigned to this point, which will be the "star" of this cluster. The algorithm now proceeds in the same way with the remaining points. As will be appreciated, the order in which the points are analyzed has a significant impact on the result. While variations on the original star clustering algorithm have been developed, they do not fully address this problem.

In the exemplary application (news article clustering to detect events), the temporal dimension is considered to be highly relevant and taking this aspect into account can improve the clustering results. The exemplary method considers that from one temporal window to another one (e.g., as mini-batches arrive), the clustering results should evolve smoothly and that two documents, even if their contents are somewhat similar, should be considered as not as close if there is a "temporal gap" in the chain of similarities that relates them in the clustering algorithm.

An additional constraint which has been found useful for this application is an immutable history constraint. This constraint requires that assignments made in the past cannot be changed in the future. Once a document has been assigned to a single cluster, it remains within that cluster. One consequence of this constraint is that one cluster cannot be split from one time period to the next one.

The exemplary algorithm includes two main phases. In the first phase (S112), the aim is to discover a complete clustering that is as consistent as possible with respect to a score function that measures the intrinsic quality of the clustering, without taking into account the number of clusters (the exemplary score function has no complexity-penalty term). In a second phase (S116, a post-processing phase), the clustering output by the first phase is refined, by merging partially overlapping (ambiguous) clusters, so that the number of clusters decreases, while degrading as little as possible the score function. Typically, this phase allows the method to cope with clusters that have non-spherical shapes.

The exemplary algorithm employs a score function that measures the quality of the clustering. Specifically, points of a cluster that are close to the cluster should have a positive contribution to the total score output by the score function, while points far away should have a negative (or no) contribution. The value of the contribution of a single point to the overall score will thus depend on the magnitude of its similarity. A threshold on the similarity from which the contribution to the score will go from positive to negative (or zero) is given by $\tau$, which can be any suitable number. In a first instance, a soft clustering of the given points is considered.

The completeness constraint (the clustering must be complete) is also imposed. In some embodiments, it may be assumed that the number of clusters k is known. However, this assumption is relaxed below, as the goal of the algorithm is to avoid having to specify this parameter.

For what follows, suppose that all the data points are defined on some vectorial space (with dimension d), that there are L2-normalized, and that the similarity between two points in this space is the cosine similarity, i.e., $$sim(p_1, p_2) = \cos(p_1, p_2) = \frac{p_1 \cdot p_2}{\|p_1\|\|p_2\|}.$$

Each cluster c can be represented by a representative point $repr(c) \in \mathbb{R}^d$, i.e., selected from real numbers in each of the dimensions (i.e., not required to correspond to one of the data points). Then, for a complete soft-clustering $\langle C, \gamma \rangle$ over the set of points P, the score of this clustering can be defined according to the cluster assignment score function:

$$score(C, \gamma) = \sum_{c \in C} \sum_{p \in \gamma(c)} (sim(p, repr(c)) - \tau) \qquad (1)$$

In Equation 1, the score is defined as the sum over all clusters and over all points assigned to that cluster of the similarity between the data point and the representative point minus the threshold. A point whose similarity to its cluster representative is less than the comparison measure threshold $\tau$ will obviously have a negative contribution to the total score. Note that one point can contribute to several (or all) clusters (as the soft-clustering case is being considered).

If the representatives repr(c) are fixed, the obvious way of choosing the assignments $\gamma$ of the data points to the clusters to maximize Equation 1 is to assign to each cluster all those points that are closer than $\tau$. Some points could then be left uncovered, and the resulting clustering would not be complete. The best which can be done for these points (in order to maximize the score function, while respecting the completeness constraint) is to assign them to the cluster of the closest representative point. This provides the following lemma:

Lemma 1: Compute Assignments with Fixed Representative Points

Suppose the representative points $repr(c_i)=r_i$ are fixed. Then, to maximize the score function while guaranteeing a complete clustering, $argmax_\gamma score(C,\gamma)=\gamma^*$, where:

$$\gamma^*(c_i)=\{p|sim(p,r_i) \geq \tau\} \cup \{p| (\nexists\, r_j | sim(p,r_j) \geq \tau) \\ \wedge (r_i = argmax_{r_j} sim(p,r_j))\} \qquad (2)$$

Equation 2 simply means that the assignment to a cluster $c_i$ includes the set of data points whose similarity to the representative point $r_i$ of that cluster is greater than the defined threshold as well as the set of data points for which there is no other representative point $r_j$ whose similarity to that representative point is greater than the defined threshold and for which $r_i$ is the closest representative point.

On the other hand, if the assignments are fixed, the representative points that maximize Equation 1 can be computed independently of the others, because multiple assignments are allowed. Therefore:

Lemma 2: Compute Representative Points with Fixed Assignments γ

Then:

$$\text{argmax} \textit{reprscore}(C, \gamma) = \textit{repr}^*,$$

$$\text{where } \textit{repr}^*(c) = \sum_{p \in \gamma(c)} \frac{p}{|\gamma(c)|}. \quad (3)$$

This lemma states that the representative points are computed as a sum of the data point vectorial representations, dividend by the number of points assigned to that cluster, i.e., as the geometric center of all the assigned points. Doing so maximizes to the score. This lemma is an obvious consequence of using the cosine as similarity measure (so that the cluster mean or centroid indeed maximizes the sum of similarities with respect to the members). Note that this lemma (and consequently the algorithm) is also valid when using any Bregman divergence as dissimilarity measure (instead of using the cosine as similarity measure). See, for example, Arindam Banerjee, et al., "Clustering with Bregman divergences," The Journal of Machine Learning Research, 6:1705-1749 (2005).

Lemmas 1 and 2 allow an Expectation-Maximization algorithm to be defined to find a local maximum for Equation 1. The algorithm starts with one cluster per point (so that the completeness constraint is trivially satisfied). Each data point is assigned to its own cluster (S110, Algorithm, step 2). The method then alternates the expectation (E) step (assignment of points to clusters, S112) and the maximization (M) step (computation of centroids, S114). Note that, as the algorithm starts with an initial configuration that satisfies the completeness constraint and that the E/M steps keep the completeness property, this sequence of operations result in a complete clustering. Pseudo-code is given in Algorithm 1 where the difference in notation between a cluster and its representative point is dropped, e.g., $\text{sim}(p,c_i)=\text{sim}(p,r_i)$. It can readily be shown that Algorithm 1 converges. Indeed, lines 4 and 5 (steps S112 and S114) necessarily lead to an increase of the score function due to Lemmas 1 and 2, respectively. As the score function given by Equation 1 is upper-bounded, the algorithm eventually converges.

---

Algorithm 1 Star-EM Clustering algorithm

---

Star-EM (P, τ)
Input: $P \subset \mathbb{R}^d$ finite, $\tau \in \mathbb{R}$ is the threshold
Output: a clustering ⟨C, γ⟩ over P
1:  C ← P
2:  γ(p) ← {p} for each p ∈ P
3: while score (C, γ) does not converge do
4:  γ(c) ← {p|sim(p, c) > τ}∪{p|(∄c_j |sim(p, c_j) > τ)∧ c = argmax$_{c_j}$ sim(p,c_j)}, for each c ∈ C (Lemma 1)
5:  $c \leftarrow \sum_{p \in \gamma(c)} \frac{p}{|\gamma(c)|}$, for each c ∈ C (Lemma 2)
6: end while
7: return ⟨C,γ⟩

---

Note that Algorithm 1 as shown above never deletes one of the clusters, so in general the algorithm outputs |P| clusters. However, from the moment when two clusters are assigned the same points (this is, $\gamma(c_1)=(c_2)$), the following evolution of both clusters will be identical. They can be merged (i.e., considered as a single cluster) at the end or, for the sake of efficiency, after each iteration (S116).

There are two generalizations of this algorithm that are to be readily appreciated:

1. Instead of maximizing a score function which adds cosine similarities, the algorithm may to minimize a score function that accumulates any Bregman divergence between a point and a cluster representative. The algorithm is the same (except the computation of the score function using the divergences instead of the similarities), because the mean (i.e. the standard centroid) of a set minimizes the sum of Bregman divergences with respect to all members of the set.

2. A kernelized version of this algorithm can be used where it is not necessary to compute explicitly the cluster mean (or centroid), nor the dot product (or cosine) between a document and the centroid. Indeed, given any kernel K(x, y) (i.e., a similarity measure that can be expressed as an inner product in some transformed space) between any two data points, then sim(p,c) can be replaced in the algorithm by:

$$\text{sim}(p, c) = \frac{\sum_{d \in \gamma(c)} K(p, d)}{\sqrt{\sum_{d_i \in \gamma(c)} \sum_{d_j \in \gamma(c)} K(d_i, d_j)}} \quad (4)$$

(assuming here that K(p, p)=1) and d represents any another data point in the collection; then step (5) is implicitly involved in the new computation of sim(p,c).

Equation (4) above can thus be used to compute a similarity between a data point and the group of data points d currently assigned to a given cluster c. This similarity computation is performed for all possible clusters. Then, for the next iteration, point p is assigned to the cluster for which Eqn. (4) gave the highest similarity (or to those clusters for which the similarity is above a given threshold). In this way, the representative point is computed implicitly rather than explicitly.

Post-Processing (S120)

At the end of the Star-EM algorithm, there are theoretically as many clusters as the number of points, from which it is easy to remove clusters that are strictly overlapping with another one (because they have the same assignment). While this addresses exactly overlapping clusters there may be clusters that are not exactly equal, but share most of their points, which it may be desirable to combine. Using a threshold on the similarity to determine if a point belongs to a cluster or not may be employed. However, this can lead to clusters shaped like hyper-spheres (if the similarity measure is isotropic, i.e., does not favor any direction) and roughly of the same size (determined by τ). However, the real data landscape does not necessarily exhibit a structure made of several spherical clusters of approximately the same radius. In one embodiment, to reduce the number of clusters, while degrading the score function as little as possible, it is desirable to merge partially overlapping (ambiguous) clusters as well. The following situation often occurs with clusters of non-spherical shapes or of size very much larger than τ: at the end of the first phase, the algorithm leads to numerous clusters that significantly overlap each other and that, globally, take the form of the real cluster. Conflicts (i.e., significant cluster overlaps) can be solved by giving preference to some clusters over the others and/or by merging clusters. Merging of clusters tends to be more flexible by allowing clusters of very different shapes and sizes. For example, the merging rule may specify that two clusters can be marked as mergeable if at least $\tau_{merge}$% of the elements of the smallest one are also members of the largest one (that is, $$\frac{|\gamma(c_1) \cap \gamma(c_2)|}{\min(|\gamma(c_1)|, \gamma(c_2)|)} > \pi_{merge}).$$

Then, all those clusters in the transitive closure of the relation mergeable are merged. For example, $\pi_{merge} \geq 50\%$ or $\pi_{merge} \geq 70\%$. Experimentally, $\pi_{merge} = 80\%$ provides good results. This approach for merging isotropic clusters (use of proportion of common elements $\pi_{merge}$, rather than proximity of the centroids $\tau_{merge}$) behaves in a very stable way with respect to perturbations in the selected threshold ($\pi_{merge}$). The algorithm, in general, is not very sensitive to this particular value.

At the end of this process, there may be some data points that belong to multiple clusters (due to weakly overlapping clusters). If a hard clustering is desired, such data points may be assigned to their nearest cluster.

The exemplary algorithm is designed as a soft clustering algorithm which tries to maintain the "soft" assignment (i.e. the ambiguity of the data point) as long as possible in the decision process. In particular, a data point could initially give raise to a cluster that may drift apart from this point and may then be captured by some other cluster(s).

Semi-Batch Clustering

In several applications, such as in the case of a news aggregator, the data points arrive periodically by mini-batches. For example, at each timestamp t, a group of points $P^t$ arrive which have to be clustered, taking into account the clustering created up to time $t-1$ ($C^{t-1}$). A clustering $C^t$ of all the data points up to time t ($P^{\leq t}$) is desired. An algorithm that takes $C^{t-1}$ and $P^t$ as input and derives $C^t$ is referred to herein as a mini-batch clustering algorithm.

At the same time, a constraint of immutable history may be required to be maintained: this means that once a document is assigned to a cluster, this assignment cannot change in a future iteration. This implies that an existing cluster cannot be split. In some embodiments, merging of two "old" clusters (at $t-1$) into one new cluster at t, may be permitted. In other embodiments, merging of this kind may be prohibited, depending on the particular usage and application. Sometimes, in order to simplify the user interface and the navigation in a base of events, it may be convenient to forbid any merge of two "old" clusters. Conversely, it could be advantageous to allow two clusters to merge; this is the case when there is not sufficient evidence to connect two clusters about the same event (possibly two singletons) but, with new information accumulating over time, the system can discover that these two clusters discuss the same event.

Figure 3:
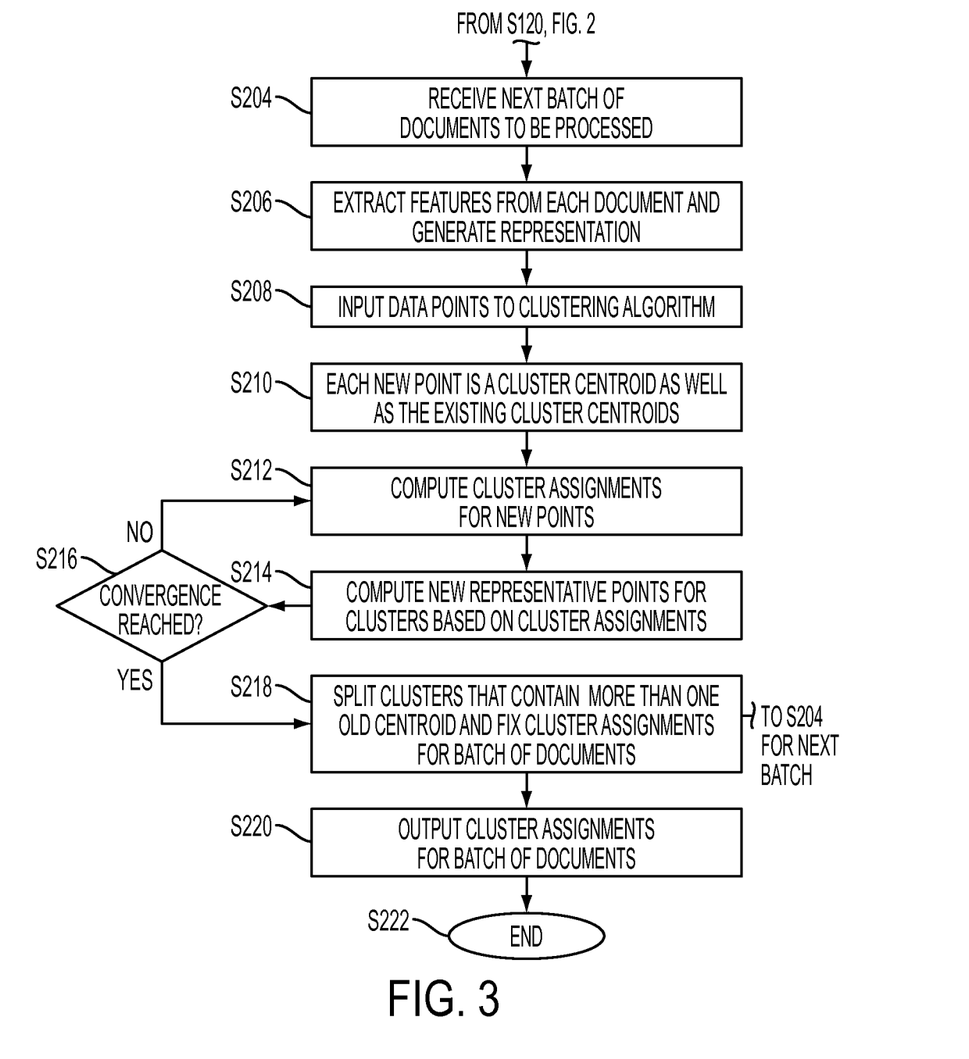
FIG. 3 is a flow chart illustrating a method for multi-batch clustering documents in accordance with another aspect of the exemplary embodiment.

As illustrated in FIG. 3, Algorithm 1 may be adapted to such a setting as follows. Past history is taken into account by the cluster centroids and their sizes (number of elements), which are used as weights in a cluster update formula; the weighted cluster centroids are then used as standard points in the clustering algorithm. Alternatively, as the cosine similarity measure which is independent of the norm of the vectors is used, one can maintain a centroid which is the sum of the feature vectors of its members, instead of the mean. In this case, the centroid update formula simply adds the new point to the centroid vector and does not use a weighted average formula. Note that by representing each cluster with its centroid, a split of a cluster is de facto impossible. Merge of clusters will occur when, during the first phase, two clusters turn out to have identical elements or when, during the second phase, two clusters overlap more than a selected amount, such as 80%. Only the first phase of the algorithm changes and can be expressed as follows in Algorithm 2 (by adopting the centroid definition as sum of vectors instead of mean of vectors):

---

Algorithm 2 Mini-Batch-Star-EM Clustering algorithm

Mini-Batch-Star-EM ( $P^t, (C^{(t-1)}, \gamma^{(t-1)}), \tau$ )
Input: $P^t \subset \mathbb{R}^d$ finite, $(C^{(t-1)}, \gamma^{(t-1)})$, $\tau \in \mathbb{R}$ is the threshold
Output: a clustering $(C^{(t)}, \gamma^{(t)})$ that integrates $P^t$ with the accumulated cluster history
1: $C^{(t)} \leftarrow P^t \cup \{c_i^{(t-1)}\}$ where $\{c_i^{(t-1)}\}$ designates the set of centroids from $C^{(t-1)}$
2: $\gamma^{(t)}(p) \leftarrow \{p\}$ for each $p \in C^{(t)}$
3: while score $(C^{(t)}, \gamma^{(t)})$ does not converge do
4: $\gamma^{(t)}(c) \leftarrow \{p \mid \text{sim}(p, c) > \tau\} \cup \{p | (\nexists c_j | \text{sim}(p, c_j) > \tau) \wedge c = \text{argmax}_{c_j} \text{sim}(p, c_j)\}$, for each $c \in C^{(t)}$
5: $c \leftarrow \Sigma_{p \in \gamma(c)} p$, for each $c \in C^{(t)}$
7: return $(C^{(t)}, \gamma^{(t)})$

---

Referring to FIG. 3, at S202, a new batch of documents to be processed is received.

At S206, features are extracted from each document and a representation (data point) generated, as for S106.

At S208, the data points are input to the clustering algorithm (which may use the same threshold $\tau$).

At S210, step 1 and 2 of the algorithm, the new set of points and the set of representative points (centroids) identified previously (at S114) each now correspond to a respective cluster.

At S212, step 4 of the algorithm, the points are assigned to these clusters, in the same manner as for S112.

At S214, step 5 of the algorithm, new representative points for the clusters are computed, as for S114.

If at S216, convergence is not yet reached, the method returns to S212.

In the case where the immutable history constraint forbids the merge of two distinct clusters from $C^{(t-1)}$ into one cluster in $C^{(t)}$, at the very end of the second phase of the algorithm (S218), each cluster of $C^{(t)}$ that contains more than one "old" centroid of $C^{(t-1)}$ is split into as many clusters as there are "old" centroids, by assigning points to their closest "old" centroid.

The cluster assignments of the documents in the mini-batch of documents are then output at S220.

The method may return to S204 when the next batch is received.

It will be appreciated that variants of the above-disclosed and other features and functions, or alternatives thereof, may be combined into many other different systems or applications. Various presently unforeseen or unanticipated alternatives, modifications, variations or improvements therein may be subsequently made by those skilled in the art which are also intended to be encompassed by the following claims.

In some embodiments, clusters which remain static (no new documents added) for at least one or a selected number of mini-batches, are archived and no new documents are added to them. Of course, if the event which is the focus of the cluster becomes active again, a new cluster can be created automatically by the system in a subsequent mini-batch.

Without intending to limit the scope of the exemplary embodiment, the following Examples demonstrate the effectiveness of the exemplary system and method.

Examples

A class-annotated collection in which each news item in the collection is assigned to some unique class, that represents an event or a story was used to test the method. The clustering outputs of the present method and existing clustering methods were compared with the real class labels. As evaluation measures, the micro-precision, micro-recall and micro-$F_1$ measure were used to evaluate the clustering performance. In other words, the cluster is considered a predictor of the class (after assigning each cluster to the class for which it gives the best $F_1$ measure, as is usually done in the clustering community) and standard quality measure is used for text categorization.

Figure 4:
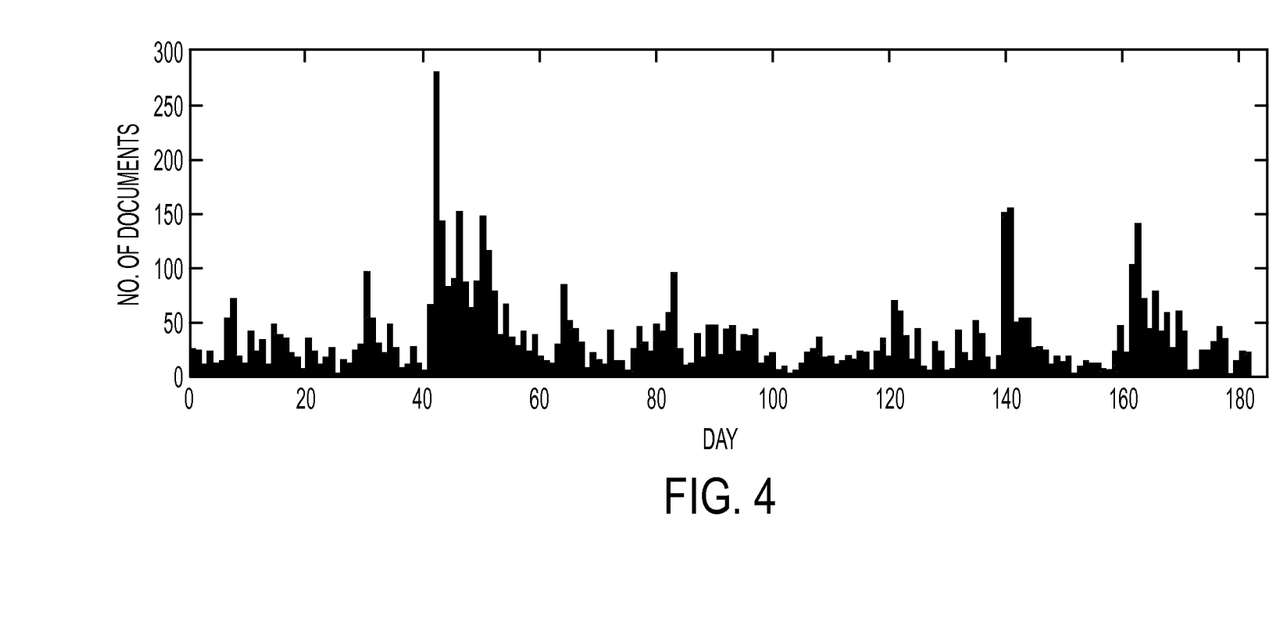
FIG. 4 shows the number of documents per day for a test set of documents.

As the test data, 6496 documents describing 126 stories were obtained from the TDT5 collection (http://www.ldc.upenn.edu/ProjectsTDT2004. TDT: Annotation manual-version 1.2), ranging from Mar. 31, 2003, to Sep. 30, 2003. The number of documents for each day was quite variable, as seen in FIG. 4

From each document, only the first paragraphs (those that contain the first 100 words) were used, which provides a strong baseline for event extraction. The documents were treated using the Xerox Incremental Parser and each document is represented by a TF-IDF vector containing detected named entities and words.

1. Full-Batch

The following clustering methods were evaluated:
1. Star-EM. The exemplary method.
2. Spherical k-means (sphkmeans) (See, I. S. Dhillon and D. S. Modha. Concept decompositions for large sparse text data using clustering. Machine learning, 42(1):143-175, 2001).
3. Affinity Propagation (AP) (See, Brendan J Frey and Delbert Dueck. Clustering by passing messages between data points. Science, 315(5814):972-6, February 2007).
4. Star-Clustering (See, Aslam).
5. DBSCAN (See, Martin Ester, Hans-Peter Kriegel, Jrg S, and Xiaowei Xu. A density-based algorithm for discovering clusters in large spatial databases with noise. In KDD, pages 226-231, 1996). DBSCAN is considered as one of the most powerful threshold-based algorithms, in particular because it is able to cope with clusters of different sizes, densities and shapes. It shares with the Star-family the idea of clustering points that are inside a $\tau$ neighborhood. It starts with one point and finds all points that are closer than $\tau$. If this set contains more than n points (n is another parameter to tune), it will be a cluster. This cluster is then extended by finding the points inside the $\tau$-hyperspheres for all points in that cluster, provided that these $\tau$-hyperspheres contain at least n points. The process for one cluster finishes when no new hypersphere contains more than n points, or no new point is added. This is then repeated for a non-visited point until all points are visited. Points that at the end of the algorithm do not belong to any cluster are considered as outsiders. This algorithm requires the presence of a second parameter (n) that has to be tuned and assumes that clusters should be dense enough to be interesting, which tends to be restrictive when clustering news items to detect events.
6. MeanShift (D. Comaniciu and Peter Meer. Mean shift: A robust approach toward feature space analysis. IEEE Transactions on pattern analysis and, pages 137, 2002). MeanShift is a gradient descent algorithm that proceeds by iteration: at each such iteration, each point shifts towards the mode of the distribution it is generated from. Using a window kernel of radius $\tau$, this corresponds to shift each point to the mean of all the points closer than $\tau$ (known here as the bandwidth parameter). A clustering can then be obtained by grouping all those points that eventually converged to the same mode (the bassin of attraction). A common drawback of this algorithm is that it generally leads to a lot of "modes" very close to each other. In practice, it is therefore necessary to unite these modes as soon as they are closer to a given threshold $\tau_{merge}$. This constitutes a second parameter that has to be tuned and, as seen below, the algorithm turns out to be very sensitive to this parameter.

7. MedoidShift, a variant of MeanShift. (Yaser Ajmal Sheikh, Erum Arif Khan, and Takeo Kanade. Mode-seeking by Medoidshifts. In ICCV, pages 1-8. IEEE, 2007). Instead of computing the mean of the points inside the hypersphere of radius $\tau$, MedoidShift computes the median, thus reducing the possible set of representative of the clusters to the set of original points. This implies a leader-based clustering, which in the case of news-event performs worse in general.

8. QuickShift, a fast variant of MeanShift (Andrea Vedaldi and Stefano Soatto, Quick Shift and Kernel Methods for Mode Seeking. In ECCV, pages 705-718. Springer, 2008), which connects each point to the nearest neighbor for which there is an increment of the density (the average similarity of points closer than $\tau$). This results in a forest from which a clustering is obtained by keeping only those branches whose similarity is bigger than $\tau_{break}$, a second parameter. Again, tuning this parameter is not straightforward and requires further learning or trial-and-errors.

9. Multi-Pass Incremental (MPincr). A version of the incremental algorithm more stable with respect to the initial order. In this algorithm, the basic incremental algorithm is repeated with randomly permuted sequences of all the data points, till convergence. The pure version of mean-shift may end up with different final points which are very close. This can be both due to an inexact numerical precision, or to similar issues faced by Star-EM and resolved in the second phase. A second threshold parameter $\tau_{merge}$ was added and two clusters were merged if their final representative are closer than $\tau_{merge}$.

For each of these algorithms, the results obtained are reported with the best (combination of) parameters: threshold ($\tau$) in the case of threshold-based algorithms (plus the minimum number of elements per cluster (n) for DBSCAN) or the number of clusters (k) in the case of sphkmeans. While AP has some parameters that may be modified, their interpretation is not straightforward and we used the default parameters (which may explain its low performance). For sphkmeans the best results for 100 random initializations are reported. The results in Table 1 show the superiority of the threshold-based algorithms for this task. The exemplary Star-EM algorithm performs better than the other algorithms.

Figure 5:
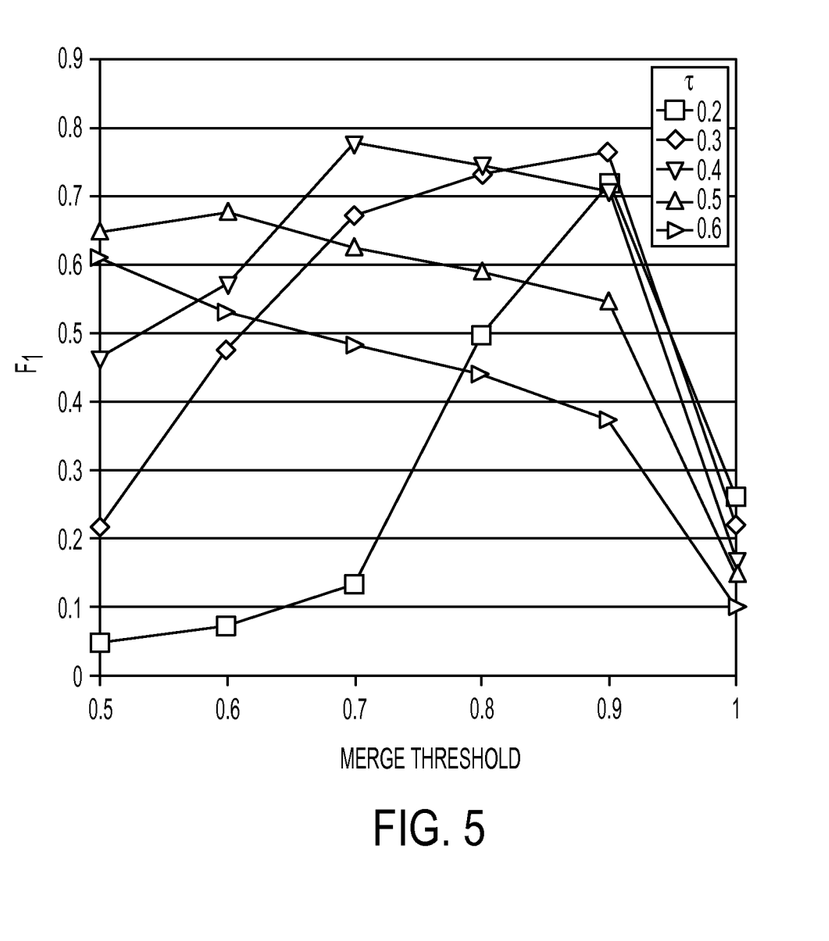
FIG. 5 shows the F1 measure of final clusters for different values of the merge threshold $\pi_{merge}$ and different values of the comparison measure threshold $\tau$ for the MeanShift algorithm.

FIG. 5 shows: $F_1$ measure of final cluster against $\tau_{merge}$ for the MeanShift algorithm. The different lines correspond to different values of $\tau$.

Figure 6:
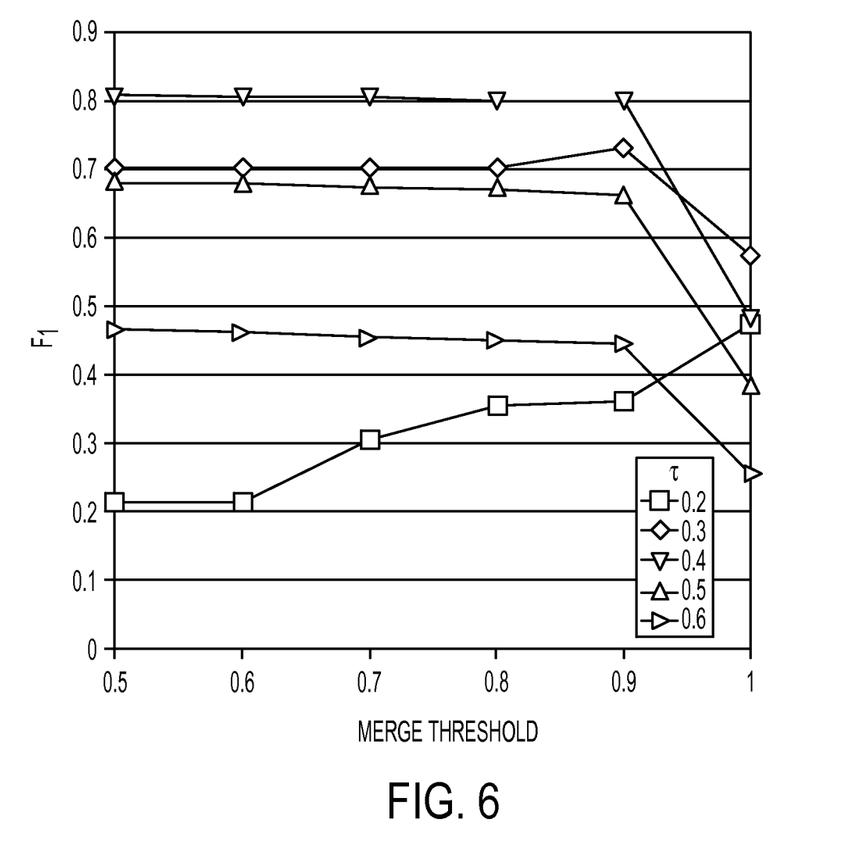
FIG. 6 shows the F1 measure of final clusters for different values of the merge threshold $\pi_{merge}$ and different values of the comparison measure threshold $\tau$ for the exemplary Star-EM algorithm.

FIG. 6 shows: $F_1$ measure of final cluster against $\pi_{merge}$ for the exemplary Star-EM algorithm. The different lines correspond to different values of $\tau$.

It may be noted that MeanShift produces only slightly worse performance than Star-EM, in its best setting. However, as illustrated in FIGS. 5 and 6, it can be appreciated that MeanShift is very sensitive to the values of the parameter $\tau_{merge}$ (FIG. 5). Varying it slightly (down to 0.7) dropped performance significantly, and from the graph it is not clear what should be a general optimal value for this threshold. The pure MeanShift corresponds to $\tau_{merge}=1$. Comparing this with FIG. 6, where a similar experiment was performed for Star-EM, varying the threshold to merge clusters in the second phase. It should be noted that the parameters have different meanings for the different methods. Note that, with the Star-EM algorithm, the final clustering is virtually unmodified if the $\pi_{merge}$ threshold is modified.

TABLE 1

Results Full-Batch

| Algorithm | Precision | Recall | $F_1$ | best threshold |
|---|---|---|---|---|
| StarEM | 0.8016 | 0.8074 | 0.8045 | $\tau = 0.39$ |
| sphkmeans | 0.6178 | 0.6410 | 0.6292 | $k = 130$ |
| AP | 0.8710 | 0.2078 | 0.3356 | — |
| DBSCAN | 0.7915 | 0.4828 | 0.5997 | $n = 1, \tau = 0.55$ |
| MPIncr | 0.7789 | 0.7442 | 0.7611 | $\tau = 0.17$ |
| StarCluster | 0.8625 | 0.6530 | 0.7433 | $\tau = 0.26$ |
| MeanShift | 0.7953 | 0.7756 | 0.7853 | $\tau = 0.32, \tau_{merge} = 0.9$ |
| MedoidShift | 0.8107 | 0.7155 | 0.7602 | $\tau = 0.21$ |
| QuickShift | 0.7138 | 0.7341 | 0.7238 | $\tau = 0.6, \tau_{break} = 0.77$ |

2. Semi-Batch

This second experiment aims at comparing the mini-batch version of Star-EM against the fully-incremental algorithm. In the semi batch version of Star-EM, a variant that respects the strict "immutable history" constraint is employed, that prevents both split and merge of clusters identified during the previous mini-batches. The documents were grouped by day, and processed them group by group. At each timestamp, those clusters which were updated in the last 12 days were selected. Any other cluster is considered inactive and is archived (used only for the final evaluation). As pointed out by Yang, this is done not only for computational efficiency, but also because similar articles separated in time are less likely to belong to the same event. (See, Yiming Yang, Tom Pierce, and Jaime Carbonell. A study of retrospective and on-line event detection. In SIGIR, pages 28-36. ACM, 1998).

The fully-incremental algorithm supposes that all points arrive one by one. For the first point $p_1$ it creates a cluster $c_1$ such that $\gamma(c_1)=\{p_1\}$. For point $p_t$ arriving at time t, it computes a similarity measure between $p_t$ and each of the clusters already existing at time t. If none of these similarities is greater than a threshold $\tau$, a new cluster is created whose only point is $p_t$. Else, $p_t$ is assigned to the most similar cluster.

There is no clear order inside the documents belonging to the same day. Such an order would not change the behavior of Star-EM, but has a strong influence in the fully-incremental algorithm. It was therefore repeated 100 times, ordering the documents inside each group randomly. The results are reported in Table 2. For the fully-incremental algorithm, the best and worst $F_1$ values are reported, together with the corresponding precision and recall values. A first significant result is the difference between the worst and best behavior of fully-incremental, of almost 10 points. While the best result is better than the one achieved with Star-EM, the performance of the exemplary algorithm is better, on the average, than the result obtained by the fully-incremental algorithm. Since the best order is not known in practice, a real application can of course not depend on it and thus may perform very badly on some batches.

TABLE 2

Results of mini-batch version of Star-EM, compared to a fully-incremental algorithm

| | Fully-Incremental | | | Star-EM |
|---|---|---|---|---|
| | max | min | average | |
| Precision | 0.8621 | 0.7135 | 0.8136 | 0.9055 |
| Recall | 0.8778 | 0.8482 | 0.8627 | 0.7848 |
| $F_1$ | 0.8699 | 0.7751 | 0.8370 | 0.8408 |
| best $\tau$ | | | 0.14 | 0.26 |

In summary, the exemplary system and method incorporate a new algorithm for clustering news articles. This algorithm uses an EM strategy to maximize a function describing the quality of the clustering. The experiments on the TDT5 benchmark collection show that it outperforms other algorithms. Moreover, the algorithm can be adapted to work in a mini-batch manner, respecting the history produced by previous iterations.

In contrast to other algorithms, it does not depend on the order in which the news articles are presented and takes into account the whole content of the mini-batch before coming to a clustering decision. One of the strengths of the algorithm over the standard algorithms is that it maintains the whole spectrum of possible assignments (i.e., it maintains cluster ambiguity) as long as possible, before making a global decision. With the second phase (the post-processing step), is also able to cope with clusters of different shapes and sizes, unlike the standard algorithm.

It will be appreciated that variants of the above-disclosed and other features and functions, or alternatives thereof, may be combined into many other different systems or applications. Various presently unforeseen or unanticipated alternatives, modifications, variations or improvements therein may be subsequently made by those skilled in the art which are also intended to be encompassed by the following claims.

What is claimed is:

1. A method for clustering documents comprising:
    assigning each of a set of data points to a respective cluster, each of the data points representing a respective document;
    with a computer processor, for a plurality of iterations:
    clustering the data points among the clusters, comprising assigning the data points to the clusters based on a comparison measure of each data point with a representative point of each cluster, and a threshold of the comparison measure, and
    for each of a plurality of the iterations, computing an overall score for the clustering, based on the assignments in the clustering of that iteration and the computed representative points for that iteration, wherein the score is computed according to:

$$\text{score}(C, \gamma) = \sum_{c \in C} \sum_{p \in \gamma(c)} (sim(p, repr(c)) - \tau)$$

where
    c represents a cluster from the set of clusters C;
    p represents one of the data points;
    $\gamma(c)$ represents the assignment of a subset of the data points to cluster c;
    $sim(p, repr(c))$ represents the cosine similarity between the data point p and cluster c's representative point; and
    $\tau$ represents the threshold; and
    based on the clustering, computing a new representative point for each of the clusters, which serves as the representative point for a subsequent iteration; and
    outputting an assignment of the documents to the clusters, based on the clustering of the data points in one of the iterations.

2. The method of claim 1, further comprising receiving a set of documents and for each document, generating the representation of each document comprising the data point.

3. The method of claim 1, wherein in the clustering, every data point is assigned to at least one of the clusters.

4. The method of claim 1, wherein in the clustering, each data point is assigned to every cluster for which it's computed comparison measure to the cluster's representative point is greater than the threshold.

5. The method of claim 4, wherein in the clustering, each data point for which there is no cluster for which its similarity to the cluster's representative point is greater than the threshold is assigned to the cluster with the nearest representative point.

6. The method of claim 1, wherein the computing of the representative point comprises computing a geometric center of the data points assigned to the cluster in the preceding clustering of the data points.

7. The method of claim 1, wherein in the assigning each of the set of data points to a respective cluster, each of the data points is assigned to exactly one cluster.

8. The method of claim 1, wherein in the assigning each of the set of data points to a respective cluster, each cluster has exactly one data point which serves as the representative point for a first of the iterations.

9. The method of claim 1, comprising continuing the iterations while the score based on the comparison measures continues to converge.

10. The method of claim 1, further comprising, prior to the outputting, merging clusters which are at least partially overlapping.

11. The method of claim 1, further comprising, for each of a plurality of the iterations, providing for identifying clusters which are completely overlapping and merging clusters that are completely overlapping into a single cluster.

12. The method of claim 1, wherein the documents comprise text documents and wherein each of the data points is representative of a set of words of the respective document.

13. The method of claim 12, wherein the documents comprise news articles.

14. The method of claim 1, wherein in the outputting, each of the documents is assigned to no more than one of the clusters.

15. A non-transitory computer program product which stores instructions, which when implemented by a computer, perform the method of claim 1.

16. A system for clustering documents comprising:
memory which stores instructions for performing the method of claim 1; and
a processor in communication with the memory which implements the instructions.

17. A system for clustering documents comprising:
memory which stores instructions for:
assigning each of a set of data points to a respective cluster, each of the data points representing a respective document;
for a plurality of iterations:
computing a comparison measure between each data point and each of a plurality of the clusters;
assigning each data point to at least one of the clusters based on the comparison measure and a threshold of the comparison measure, and
for each of a plurality of the plurality of iterations, computing a score for the cluster assignment as a function of a sum over all the clusters and all data points of the comparison measure between each data point and the representative point of the cluster to which the data point is assigned minus the threshold according to:

$$\text{score}(C, \gamma) = \sum_{c \in C} \sum_{p \in \gamma(c)} (sim(p, repr(c)) - \tau),$$

where
c represents a cluster from the set of clusters C;
p represents one of the data points;
$\gamma(c)$ represents the assignment of a subset of the data points to cluster c;
sim (p,repr (c)) represents the comparison measure between the data point p and cluster c's representative point; and
$\tau$ represents the threshold, and
outputting an assignment of the documents to the clusters, based on the clustering of the data points, which optimizes the score in one of the iterations; and
a processor in communication with the memory which implements the instructions.

18. The system of claim 17, further comprising a feature extractor which extracts features from each of the documents and a representation generator which generates a representation of the document based on the extracted features.

* * * * *